United States Patent [19]

Kuijk

[11] Patent Number: 4,810,059

[45] Date of Patent: Mar. 7, 1989

[54] DISPLAY DEVICE WITH THREE-LEVEL DRIVE

[75] Inventor: Karel E. Kuijk, Eindhoven, Netherlands

[73] Assignee: U.S. Philips Corp., New York, N.Y.

[21] Appl. No.: 55,494

[22] Filed: May 29, 1987

[30] Foreign Application Priority Data

May 29, 1986 [NL] Netherlands ........................ 8601373

[51] Int. Cl.⁴ ........................ G02F 1/133; G09G 3/34

[52] U.S. Cl. .................................... 350/333; 350/332; 340/784

[58] Field of Search .................... 350/332, 333, 339 R; 340/784, 719, 765, 783, 752

[56] References Cited

U.S. PATENT DOCUMENTS

| | | | |
|---|---|---|---|
| 3,654,606 | 4/1972 | Marlowe et al. | 350/332 |
| 3,976,362 | 8/1976 | Kawakami | 350/333 |
| 4,070,663 | 1/1978 | Kanatani et al. | 340/811 |
| 4,109,241 | 8/1978 | Shanks | 350/333 |
| 4,146,876 | 3/1979 | Arellano et al. | 350/357 |
| 4,203,106 | 5/1980 | Dalisa et al. | 350/362 |
| 4,223,308 | 9/1980 | Baraff et al. | 350/334 |
| 4,251,136 | 2/1981 | Miner et al. | 350/334 |
| 4,427,266 | 1/1984 | Hosakawa | 350/333 |
| 4,583,087 | 4/1986 | van de Venne | 350/334 |
| 4,589,733 | 5/1986 | Yaniv et al. | 350/333 |
| 4,709,992 | 12/1987 | Ueno | 350/333 |
| 4,715,685 | 12/1988 | Yaniv et al. | 350/332 |
| 4,730,140 | 3/1988 | Masubuchi | 350/333 |
| 4,731,610 | 3/1988 | Baron et al. | 340/784 |
| 4,748,445 | 5/1988 | Togashi et al. | 340/784 |

FOREIGN PATENT DOCUMENTS

| | | | |
|---|---|---|---|
| 0182645 | 5/1986 | European Pat. Off. | 350/334 |

OTHER PUBLICATIONS

Lechner et al.–"Liquid Crystal Matrix Displays", Proceedings of the IEEE–vol. 59–No. 11–Nov. 1971–pp. 1566–1579.

H. Kawakami–"Matrix Adressing Technology of TN Liquid Crystal Display", Oct. 1976–Biennial Display Conference, New York–U.S.A.–pp. 50–52.

*Primary Examiner*—John S. Heyman
*Assistant Examiner*—Tai V. Duong
*Attorney, Agent, or Firm*—Bernard Franzblau

[57] ABSTRACT

A three-level drive for a display device is obtained by choosing two levels for the "non-selection" voltages of a display device driven by a diode matrix. This three-level drive reduces the cut-off voltage across the diodes in the diode matrix, which provides a wider choice of diodes.

20 Claims, 5 Drawing Sheets

DISPLAY DEVICE WITH THREE-LEVEL DRIVE

BACKGROUND OF THE INVENTION

This invention relates to a display device comprising an electro-optical display medium between two supporting plates, a system of picture elements arranged in rows and columns with each picture element being constituted by two picture electrodes provided on the facing surfaces of the supporting plates, a system of row and column electrodes for driving the picture elements, the row electrodes being provided on the one supporting plate and the column electrodes being provided on the other supporting plate.

The terms row electrode and column electrode in this application may be interchanged, if desired, so that a column electrode may be meant where reference is made to a row electrode while simultaneously changing column electrode to row electrode.

A display device of this type is suitable for displaying alpha-numeric and video information with the aid of passive electro-optical display media such as liquid crystals, electrophoretic suspensions and electrochromic materials.

The known passive electro-optical display media generally have an insufficiently steep transmission characteristic with respect to the applied voltage and/or have an insufficient intrinsic memory. Owing to these properties the number of lines to be driven is limited to achieve sufficient contrast in multiplexed matrix display devices. Due to the lack of memory the information presented to a selected row via the column electrodes is to be written time and again. In addition the voltages applied to the column electrodes are not only present across the picture elements of a driven row but also across the picture elements of all other rows. Consequently picture elements receive an effective voltage during the time when they are not driven, which voltage must be sufficiently small so as not to bring a picture element to the on-state. Furthermore the ratio of the effective voltage of a picture element in the on and off-state decreases with an increasing number of row electrodes. Due to the lack of a sufficiently steep characteristic the contrast between picture elements in the on and off-states therefore decreases.

By using a switch for each picture element a memory action is obtained so that the information presented to a driven row remains present across a picture element to a sufficient extent during the time when the other row electrodes are driven, although in this case information may also get lost due to leakage currents.

A display device as described above in which diodes are used as switches is known from U.S. Pat. No. 4,223,308.

However, the use of such display devices in television systems may present problems. In a control system which is conventionally used for television such as the PAL (NTSC) system, approximately 575 (525) lines are written during each frame period of 1/25 sec (1/30 sec) distributed over an even and an odd field of approximately 288 (265) lines each per 1/50 (1/60) second. In order to obviate degradation of the liquid crystal material, display cells are preferably alternately driven with a negative and a positive voltage across the liquid crystal. For a display screen with approximately 288 (265) lines it is possible to first drive the picture cells with the information which has been presented during the odd field period and subsequently with the information which has been presented during the even field period, while the voltage across the picture cell has a different polarity during the odd field period than during the even field period. In this case interlacing does not take place, but the second picture line is written on the first picture line, the fourth on the third, and so forth. Information of the same polarity presented to a pixel is then replenished every 1/50 sec (1/60 sec) and its polarity is changed. The number of picture lines on the screen is then in fact only half the total number of lines of the two fields.

However, in order to write a complete picture of 575 (525) lines, the picture information must be presented in an interlaced manner so that the information of opposite polarity is not replenished after 1/50 (1/60) sec but after 1/25 (1/30) sec, while information of the same polarity is presented every 2/25 (1/15) sec. Since the picture cells are then driven with the same (positive or negative) voltages for a longer time, this information may get partly lost due to leakage currents. Due to inequalities between positive and negative information a flickering effect may also occur in the picture at a frequency of 25/2 (15) Hz.

In the non-prepublished Netherlands application No. 8502663, to which U.S. patent application No. 06/913,157 corresponds, filed by Applicant on Sept. 26, 1986 a display device of the type defined in the opening paragraph is described, which can be driven with the PAL (NTSC) system in which the picture quality is not reduced or is hardly reduced by flickering, while also the influence of leakage currents is considerably reduced. The said application defines with which selection and data voltages such a device can be operated and which voltages are identical in absolute value for even and odd fields. Notably the "non-selection" voltage of the odd lines in the even field, after writing a picture line of the even field, is chosen to be equal to the "non-selection" voltage after writing a picture line of the odd field. The same applies to the "non-selection" voltages of the even lines. If diodes are used as asymmetrical non-linear switching elements, driving of, for example, an LCD matrix by such a "two-level" drive may lead to such a cut-off voltage across the diodes that the leakage currents become unacceptably large.

SUMMARY OF THE INVENTION

It is an object of the present invention to substantially obviate this drawback.

To this end a display device according to the invention is characterized in that in series with each picture element between a column electrode and two consecutive row electrodes asymmetrical non-linear switching elements are incorporated between the picture element and each of the row electrodes and in that the device comprises a drive circuit for driving the row electrodes with selection voltages which upon selection of the $i^{th}$ row electrode ($0<i\leq n$) for driving picture elements with information from a first odd or second even field provides at least the first $(i-1)$ non-selected row electrodes with at least one of a first set of non-selection voltages associated with the relevant field and provides the other non-selected row electrodes with at least one of a second set of non-selection voltages.

In this Application an asymmetrical non-linear switching element is in the first instance understood to mean a diode conventionally used in manufacturing the said display devices such as, for example, a pn diode, Schottky diode or pin diode formed in monocrystalline, polycrystalline or amorphous silicon, CdSe or another semiconductor material, although also other asymmetrical non-linear switching elements are not excluded such as, for example bipolar transistors with short-circuited base-collector junctions or MOS transistors whose gate is interconnected to the drain zone.

The display device preferably comprises a drive circuit for driving picture elements in a manner such that two consecutive picture elements in a column are each time connected via asymmetrical non-linear switching elements to a common row electrode, the switching elements, viewed from the common row electrode to the other row electrodes associated with each of the two consecutive picture elements being biassed in the same direction and the (i+1) row electrode being provided with a voltage associated with the first set of non-selection voltages. By choosing the second and the fourth non-selection voltages and the first and the third non-selection voltages respectively, to be substantially identical in an absolute sense and likewise the selection voltages, three voltage levels for the purpose of driving can suffice.

It is found that the use of such a "three-level" drive considerably reduces the cut-off voltage across the diode so that picture degradation due to leakage currents is prevented.

The desired drive may be realised, for example, in that each row electrode can be connected in an electrically conducting manner via a first switch to a connection for a selection voltage, or can be connected in an electrically conducting manner via a second switch to a point which can be connected in an electrically conducting manner via a third or fourth switch to connections for non-selection voltages.

The said drive can take place with a 1:n decoder but also from a register stage of a shift register or another register, possibly provided with a hold circuit or amplifier stage which transforms the information stored in the register stage to voltages of the desired level.

For the switches, for example, n-channel MOS transistors can be chosen, but it is alternatively possible to choose p-channel MOS transistors or both, or bipolar transistors.

BRIEF DESCRIPTION OF THE DRAWINGS

The invention will now be described in greater detail with reference to some embodiments shown in the drawings in which.

DESCRIPTION OF THE PREFERRED EMBODIMENTS

Figure 1:
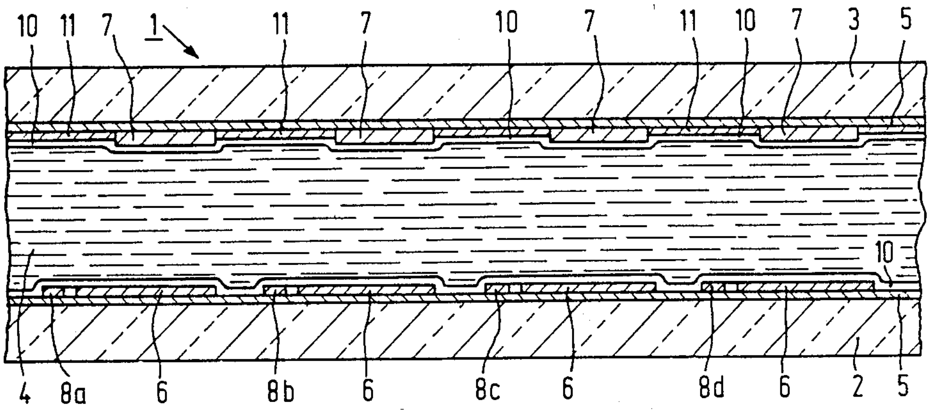
FIG. 1 diagrammatically shows a cross-section of part of a display device according to the invention, FIG. 2 diagrammatically shows a transmission/voltage characteristic of a display cell in such a display device, FIG. 3 diagrammatically shows part of a drive circuit for a display device according to the non-prepublished Netherlands patent application No. 8502663.

FIG. 1 diagrammatically shows a cross-section of part of a display device 1 which is provided with two supporting plaes 2 and 3 between which a liquid crystal 4 is present. The inner surfaces of the supporting plates 2 and 3 are provided with electrically and chemically insulating layers 5. A large number of picture electrodes 6 and 7 are provided in rows and columns on the supporting plates 2 and 3, respectively. The picture electrodes 6 and 7 which face each other constitute the picture elements of the display device. Strip-shaped column electrodes 11 are provided between the columns of picture electrodes 7. Advantageously, the column electrodes and the picture electrodes 7 can be integrated to strip-shaped electrodes. Strip-shaped row electrodes 8*a*, *b*, *c*, *d*, etc. are provided between the rows of picture electrodes 6. Each picture electrode 6 is connected to two row electrodes 8 by means of diodes $9^a$, $9^b$, $19^a$, $19^b$ not visible in FIG. 1. With the aid of voltages on the row electrodes 8 the diodes 9, 19 provide the liquid crystal 4 with a sufficient threshold with respect to the voltage applied to the column electrodes 11 and provide the liquid crystal 4 with a memory. Furthermore liquid crysal orienting layers 10 are provided on the inner surfaces of the supporting plates 2 and 3 and covering the electrodes 6, 7, 8 and 11. As is known, a different orientation state of the liquid crystal molecules and hence an optically different state can be achieved by applying a voltage across the liquid crystal layer 4. The display device may be realised both as a transmissive and as a reflective device.

Figure 2:
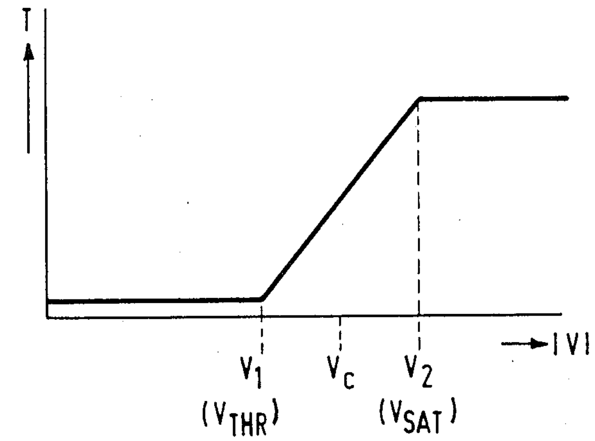

FIG. 2 diagrammatically shows a transmission voltage characteristic of a display cell as occurs in the display device of FIG. 1. Below a given threshold voltage $V_1$ (or $V_{THR}$) the cell passes substantially no light, whereas above a given saturation voltage $V_2$ (or $V_{sat}$) the cell is substantially completely light-transmissive. In this respect it is to be noted that the absolute value of the voltage is plotted along the abscissa because such cells are usually driven with an alternating voltage.

Figure 3:
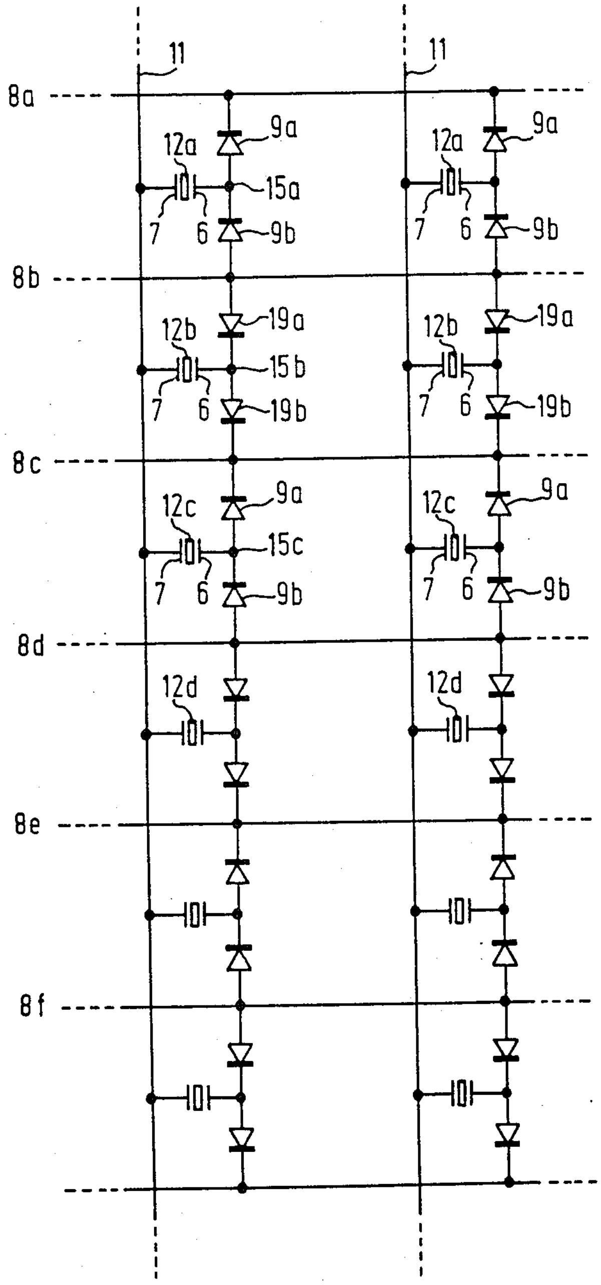

FIG. 3 diagrammatically shows a first embodiment of part of a display device according to the invention.

In this Figure picture elements 12 are connected at one end via the picture electrodes 7 to column electrodes 11 which together with the row electrodes 8 are arranged in the form of a matrix. The picture elements 12 are connected at their other ends via diodes $9^a$, $9^b$, $19^a$, $19^b$ to the row electrodes 8. In this case, for example, the row electrode $8^b$ is connected via a diode $9^b$ to a picture element $12^a$ and via a diode $19^a$ to a picture element $12^b$ so that this row electrode 8*b* is common to the picture elements $12^a$ and $12^b$. Likewise, the row electrode $8^c$ is common to the picture elements $12^b$ and $12^c$ because it is connected to these picture elements via the diodes $19^b$ and $9^a$, and so forth.

The device according to the invention is driven as follows. During an odd field period (for example) the lines (row electrodes) $8^a$, $8^c$, $8^e$ etc. are successively selected (in this example, rendered low in voltage). The capacitors constituted by the picture elements $12^a$ are then discharged via diodes $9^a$, dependent on the information at the column electrodes 11 which corresponds to the information of the first picture line. Subsequently, picture elements $12^b$ are discharged via diodes $19^b$, dependent on the information at the column electrodes 11, and in addition picture elements $12^c$ are discharged via diodes $9^a$. If they are not selected, the odd lines $8^a$, $8^c$, $8^e$ receive such a high voltage and the (even) lines (row electrodes) $8^b$, $8^d$, $8^f$ receive such a low voltage that only the diodes $9^a$, $19^b$ connected to a selected (odd) row electrode can conduct and all other diodes are cut off.

During an even field period the row electrodes $8^b$, $8^d$, $8^f$, etc. are successively selected (rendered high in voltage) so that capacitors constituted by the picture elements $12^a$ and $12^b$, $12^c$ and $12^d$ etc. are charged with the information at the column electrodes 11 which corresponds to the information of the second, fourth picture line, etc. because the diodes $9^b$ and $19^a$ which connect the picture elements 12 to the row electrodes $8^b$, $8^d$, etc. can now successively conduct and the voltages at the other selection lines (that is to say, the non-selected even lines and the odd lines) are chosen to be such that all other diodes are cut off.

In this manner each picture element is driven during one complete frame period with the information from an even and an odd field period. Thus the average information of the first and the second picture line is written on the first row of picture elements $12^a$, the average information of the second and the third picture line is written on the second row of picture elements $12^b$, the average information of the third and the fourth picture line is written on the third row of picture elements, and so forth.

Due to the construction chosen, during each field period of 20 msec (PAL system) or 16.7 msec (NTSC system) the information is replenished and reversed in polarity, while there are only (n+1) row electrodes (connections) required for n rows of picture elements. In this manner an LCD display device can thus be realised which is suitable for reception of PAL signals (575 visible lines) or NTSC signals (525 visible lines). Since, in addition, the voltage of the non-selected row electrodes can be chosen to be sufficiently high or low so that all other diodes are cut off, an LCD material or another electro-optical material can be chosen with an arbitrary threshold and saturation voltage, while the influence of spread in the diode characteristics of the diodes 9, 19 can be ignored.

The device shown is very suitable for using a drive method in which $$V_C = \frac{V_{SAT} + V_{THR}}{2}$$

is chosen for the mean voltage across a picture element (see FIG. 2). In this method the absolute value of the voltage across the picture elements 12 is substantially limited to the range between $V_{THR}$ and $V_{SAT}$. This is further described in "A LCTV Display Controlled by a-Si Diode Rings" by S. Togashi et al, SID 84, Digest page 324–5.

With this drive around $V_C$ and with on and off-voltages $V_{ON}$ and $V_{OFF}$ for the diodes 9, 19, then during the odd field period the pixel $15^a$ should acquire a mean voltage $V_C = -\frac{1}{2}(V_{SAT}+V_{THR})$ upon selection and $V_C = \frac{1}{2}(V_{SAT}+V_{THR})$ during the even field period.

The on-voltage $V_{ON}$ is a voltage at which the current through the diode is sufficiently large to charge the capacitor associated with the picture element rapidly, while the voltage $V_{OFF}$ is chosen such that the associated current is so small that the same capacitor is substantially not discharged.

A good effect as far as gradations (grey scales) are concerned is achieved when dependent on the information at the column electrode 11 the capacitor constituted by the picture element $12^a$ is discharged or charged during the drive via the row electrodes 8 to voltage values between a maximum voltage $V_C + V_{DMAX} = V_{SAT}$ and a minimum voltage $V_C - V_{DMAX} = V_{THR}$. Elimination of $V_C$ yields $$V_{DMAX} = \tfrac{1}{2}(V_{SAT} - V_{THR}) \qquad \text{(a)}$$

Upon selection of other picture elements all voltages between $-V_{DMAX}$ and $+V_{DMAX}$ may occur at the column electrodes 11. Via capacitive couplings the maximum and minimum voltages at the junction 15 during odd field periods then are:

$$V_{MIN} = -V_{DMAX} - V_{SAT} \text{ and}$$

$$V_{MAX} = V_{DMAX} + V_{SAT}, \text{ respectively.}$$

If other row electrodes 8 are selected, the junctions 15 may just not be discharged via other electrodes 8 so that for the odd electrodes it holds that $$V_{NONSEL} + V_{OFF} \geqq V_{MAX} = V_{DMAX} + V_{SAT}$$

or $$V_{NONSELodd} \geqq \tfrac{1}{2}(V_{SAT} - V_{TH}) + V_{SAT} - V_{OFF} \qquad \text{(b)}$$

while for the even electrodes it holds that $$V_{NONSELodd} - V_{OFF} \leqq V_{MIN} = V_{DMAX} + V_{SAT}$$

or $$V_{NONSELeven} \leqq -\tfrac{1}{2}(V_{SAT} - V_{TH}) - V_{SAT} + V_{OFF} \qquad \text{(c)}$$

For the selection voltages it holds that $$V_{SELodd} = -\tfrac{1}{2}(V_{SAT} + V_{TH}) - V_{ON} \qquad \text{(d)}$$

$$V_{SELeven.} = \tfrac{1}{2}(V_{SAT} + V_{TH}) + V_{ON} \qquad \text{(e)}$$

The information (data) at the column electrodes 11 reverses sign during each field period.

Figure 4:
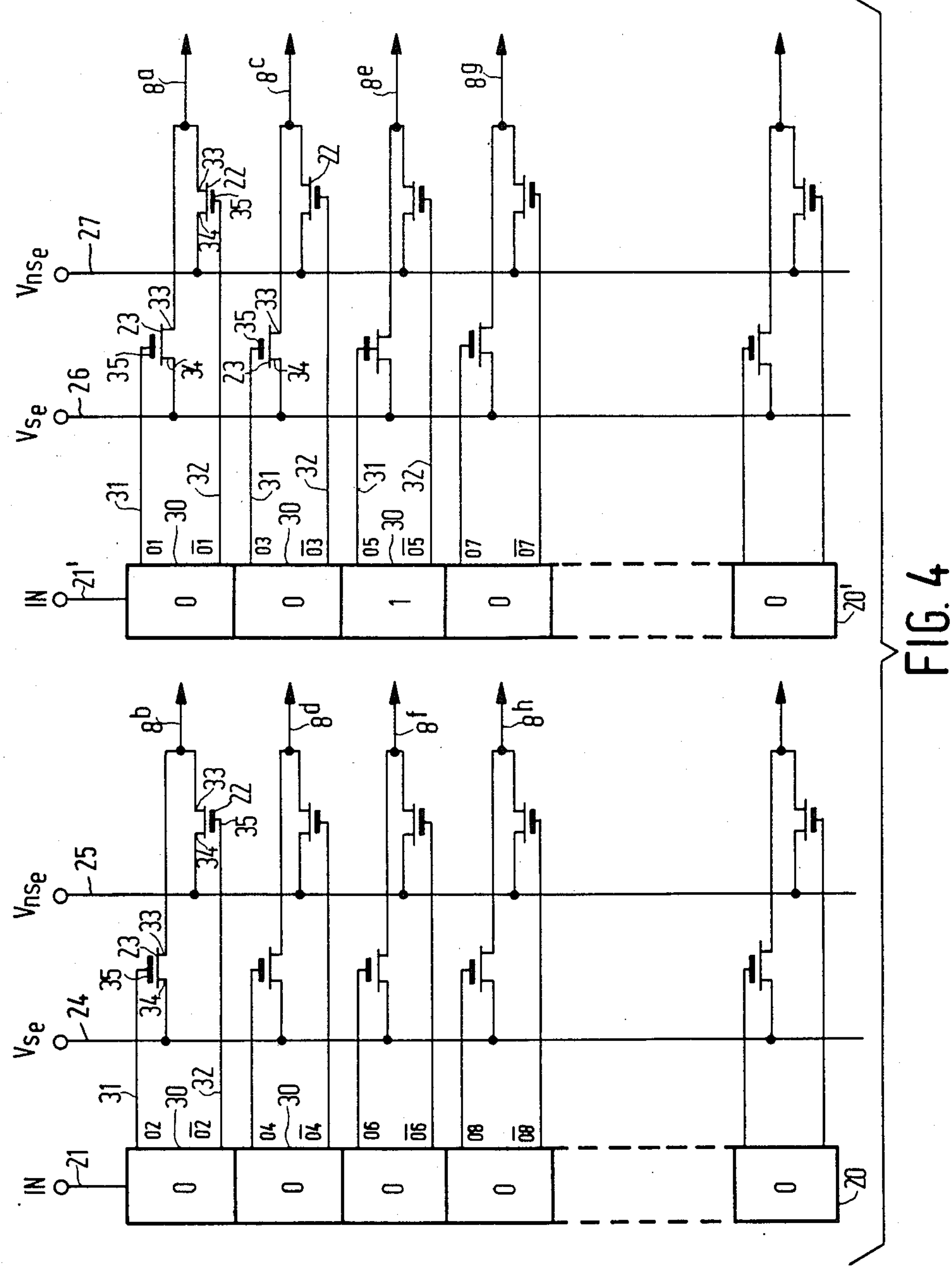
FIG. 4 shows another part of this drive circuit.

The above-mentioned voltages for which it holds that $$|V_{SELodd}| = |V_{SELeven}| \text{ and } |V_{NONSELodd}| = |V_{NONSELeven}|$$

can be obtained with a circuit as shown in FIG. 4. Each of the row electrodes 8 is connected via switches 22 and 23, in this example n-channel MOS transistors, to input lines 24, 25, 26, 27. The row electrodes 8 are connected in an electrically conducting manner to the drain zones 33 of the transistors 22, 23, while the source zones 34 of the transistors 22, 23 for driving the odd lines $8^a$, $8^c$, $8^e$, $8^g$, . . . are connected to the input lines 26 and 27 to which the voltages $V_{SELodd}$ and $V_{NONSELodd}$ are presented and the source zones 33 of the transistors 22, 23 for driving the even lines $8^b$, $8^d$, $8^f$, $8^h$, . . . are connected to the input lines 24 and 25 to which the voltages $V_{SELEVEN}$ and $V_{NONSELEVEN}$ are presented. The transistors 22, 23 are driven in this example from shift registers 20 and 20' for the even and odd electrodes, respectively. The output 31 of a register stage 30 is connected in an electrically conducting manner to a gate electrode 35 of a transistor 23, while the complementary output 32 is connected in an electrically conducting manner to the gate electrode 35 of a transistor 22. A first register stage of a register 20, 20' is now rendered high (1) via inputs 21, 21', while all other register stages remain low (0). The n-channel MOS transistor 23 associated with this register stage starts conducting and consequently the associated row electrode 8 is connected to $V_{SEL}$. The complementary output 32 is low so that the transistor 22 associated with this register stage does not conduct.

All other register stages are low (0), that is to say, only the associated transistors 22 driven by the complementary outputs 32 conduct so that all other row electrodes are connected to $V_{NONSEL}$.

Figure 5:
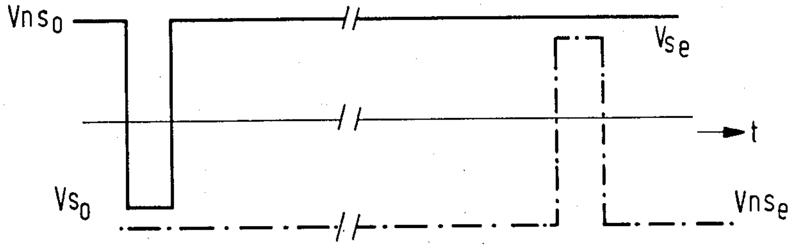
FIG. 5 shows the associated voltage variation on the row electrode.

Subsequently the next register stage is rendered high by shifting the one (1) in a subsequent clock period over one register stage while the first stage becomes low (0) again, and so forth. In the example of FIG. 4 the "1" is shifted to the $3^{rd}$ stage associated with the odd field, that is to say, row electrode $8^e$ is connected to $V_{SELodd}$ while all other row electrodes are connected to $V_{NONSELodd}$ or $V_{NONSELeven}$. After all odd row electrodes have been selected, the even row electrodes are selected whereafter the cycle is repeated. FIG. 5 shows the associated voltage variation for an odd row electrode (solid line) and the subsequent even row electrode (dot-and-dash line).

Instead of the n-type transistors shown, p-type transistors may be alternatively used, while the connections at the inverting and non-inverting outputs of the shift register are to be exchanged. The circuit may be alternatively realised with, for example, CMOS transistors, in which the gate electrodes of the complementary transistors are driven by one output of the shift register or a 1:N decoder.

At the above-mentioned voltage levels the cut-off current of the diodes 9 must be sufficiently small at a maximum cut-off voltage in order to counteract loss of information. This cut-off voltage is $$V_{MAXSPER}=V_{NONSELodd}-V_{NONSELeven}+-V_{OFF}=3V_{SAT}-V_{THR}-V_{OFF}$$

where $V_{OFF}$ is the forward voltage of the diode at which the leakage current is still high enough to be ignored. For a liquid crystal (MERCK, ZLI84460) it typically holds that $V_{SAT}\simeq 3.6$ Volt and $V_{TH}\simeq 2.1$ Volt, while for a diode $V_{OFF}\simeq 0.4$ Volt. Then $V_{MAXSPER}\simeq 8.3$ Volt which may imply unacceptably high leakage currents.

In the derivation of the formulas (b), (c), (d), (e) the starting point is a maximum voltage sweep $2V_{SAT}$ at the junction 15. In the ideal case, however, it holds that after writing a line of the odd field the voltage across the capacitor formed by a picture element 12 of the row that has just been written lies between the extreme values $-V_{THR}$ and $-V_{SAT}$. Therefore it holds for the extreme values at the junctions 15 after writing a line of the odd field that:

$$V_{MIN}=-V_{SAT}-V_{DMAX}$$

$$V_{MAX}=-V_{THR}+V_{DMAX}$$

For the odd electrodes it holds that $$V_{NONSELodd}+V_{OFF}\geqq V_{MAX}=-V_{THR}+V_{DMAX}$$

or $$V_{NONSELodd}\geqq \tfrac{1}{2}(V_{SAT}-V_{THR})-V_{THR}-V_{OFF} \qquad \text{(f)}$$

and for the even electrodes $$V_{NONSELeven}-V_{OFF}\leqq V_{MIN}=-V_{SAT}-V_{DMAX}$$

or $$V_{NONSELeven}\leqq -\tfrac{1}{2}(V_{SAT}-V_{TH})-V_{SAT}+V_{OFF} \qquad \text{(g)}$$

whereas for $V_{SEL}$ it holds that $V_{SELodd}=-\frac{1}{2}(-V_{SAT}+V_{TH})-V_{ON}$(d)

Similarly, it holds that after writing a line of the even field the voltage for non-selection across the capacitor formed by a picture element 12 is at most $V_{SAT}$ and at least $V_{THR}$. Therefore it holds for the extreme values at the junctions 15 after writing a line of the even field that $$V_{MIN}=V_{THR}-V_{DMAX}$$

$$V_{MAX}=V_{SAT}+V_{DMAX}$$

For the non-selection voltages at the even and odd electrodes it holds that after writing a line of the even field $$V_{NONSELeven}-V_{OFF}\leqq V_{MIN}=V_{THR}-V_{DMAX}$$

$$V_{NONSELeven}\leqq -\tfrac{1}{2}(V_{SAT}-V_{THR})+V_{THR}+V_{OFF} \qquad \text{(h)}$$

and $$V_{NONSELodd}V_{OFF}\geqq V_{MAX}=V_{DMAX}+V_{SAT}$$

$$V_{NONSELodd}\geqq \tfrac{1}{2}(V_{SAT}-V_{TH})+V_{SAT}-V_{OFF} \qquad \text{(i)}$$

while for the selection voltage during the even field it holds that $$V_{SEL}=\tfrac{1}{2}(V_{SAT}+V_{THR})+V_{ON} \qquad \text{(e)}$$

even field.

For driving the picture elements each line electrode may now assume 3 voltage levels.

Figure 6:
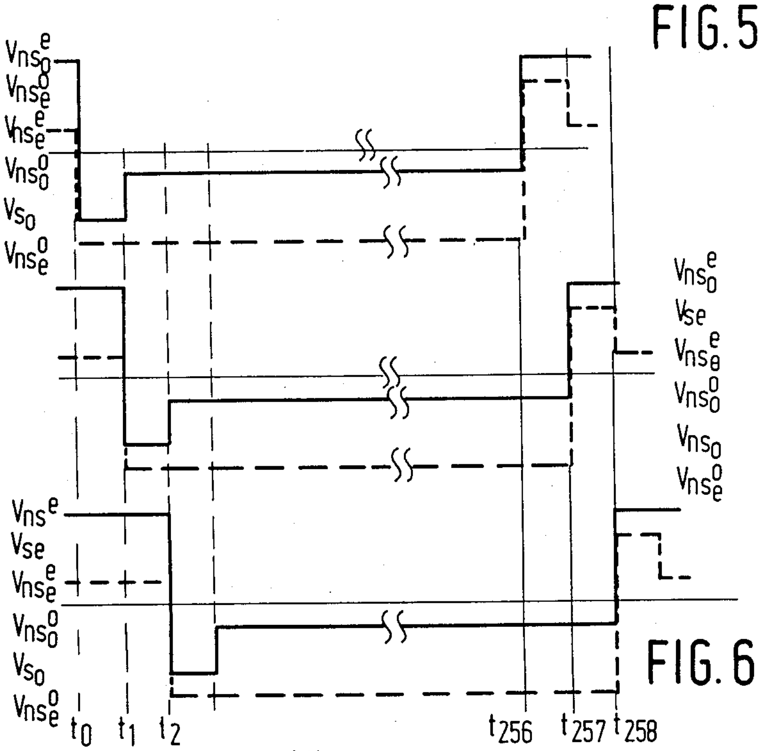
FIG. 6 shows a set of driving voltages according to the invention.

FIG. 6 shows the voltage variation for, for example, the first three odd row electrodes (represented by a solid line) and subsequent even row electrodes (represented by a dashed line). In summary, it holds for the voltage levels shown that:

Odd field $$V_{s0}=V_{SELodd}=-\tfrac{1}{2}(V_{SAT}+V_{THR})-V_{ON} \qquad \text{(d)}$$

$$V_{ns0}^{o}=V_{NONSELodd}=\tfrac{1}{2}(-V_{SAT}-V_{THR})-V_{THR}-V_{OFF} \qquad \text{(f)}$$

$$V_{nse}^{o}=V_{NONSELeven}=-\tfrac{1}{2}(V_{SAT}-V_{THR})--V_{SAT}+V_{OFF} \qquad \text{(g)}$$

Even field:

$$V_{se}=V_{SELeven}=\tfrac{1}{2}(V_{SAT}+V_{THR})+V_{ON} \qquad \text{(e)}$$

$$V_{nse}^{e}=V_{NONSELeven}=-\tfrac{1}{2}(-V_{SAT}-V_{THR})+V_{THR}+V_{OFF} \qquad \text{(h)}$$

$$V_{ns0}^{e}=V_{NONSELodd}=\tfrac{1}{2}(V_{SAT}-V_{THR})+V_{SAT}-V_{OFF} \qquad \text{(i)}$$

Here it holds that $$|V_{SELeven}=|V_{SELodd}|$$

$$|V_{NONSELodd}|=|V_{NONSELeven}|=|V_L|$$

$$\underset{\text{odd field}}{\overset{\text{odd field}}{\left|\begin{matrix}V_{NONSEL}\\ \text{even}\end{matrix}\right|}} = \underset{\text{even field}}{\overset{\text{even field}}{\left|\begin{matrix}V_{NONSEL}\\ \text{odd}\end{matrix}\right|}} = |V_H|$$

where $|V_L| < |V_H|$

In the voltages derived for this 3-level drive it holds for the maximum cut-off voltage across a diode 9 (within a field) that $$V_{MAXSPER}=V_{NONSELodd}-V_{NONSELeven}+-V_{OFF}=2(V_{SAT}-V_{THR})-V_{OFF}$$

The maximum cut-off voltage is decreased by a value $(V_{SAT}+V_{TH})$ and becomes approximately 2.6 Volt in the above given example. At such a cut-off voltage the leakage current is considerably less. In addition diodes with lower cut-off voltages can be used because the cut-off voltage has been decreased.

The variation of the voltages presented on the electrodes of a display device with, for example, 512 row electrodes is diagrammatically shown in the Table below.

| | Time | | | | | | | | | | |
|---|---|---|---|---|---|---|---|---|---|---|---|
| row | $t_0$ | $t_1$ | $t_2$ | $t_3$ | ... | $t_{255}$ | $t_{256}$ | $t_{257}$ | $t_{258}$ | ... | $t_{511}$ |
| 1 | $V_{s0}$ | $Vns_0^o$ | $Vns_0^o$ | $Vns_0^o$ | ... | $Vns_0^o$ | $Vns_0^e$ | $Vns_0^o$ | $Vns_0^o$ | ... | $Vns_0^e$ |
| 2 | $Vns_e^o$ | $Vns_e^o$ | $Vns_e^o$ | $Vns_e^o$ | ... | $Vns_e^o$ | $Vs_e$ | $Vns_e^e$ | $Vns_e^e$ | ... | $Vns_e^e$ |
| 3 | $Vns_0^e$ | $V_{s0}$ | $Vns_0^o$ | $Vns_0^o$ | ... | $Vns_0^o$ | $Vns_0^e$ | $Vns_0^e$ | $Vns_0^e$ | ... | $Vns_0^e$ |
| 4 | $Vns_e^e$ | $Vns_e^o$ | $Vns_e^o$ | $Vns_e^o$ | ... | $Vns_e^o$ | $Vns_e^o$ | $Vs_e$ | $Vns_e^e$ | ... | $Vns_e^e$ |
| 5 | $Vns_0^e$ | $Vns_0^e$ | $V_{s0}$ | $Vns_0^o$ | ... | $Vns_0^o$ | $Vns_0^o$ | $Vns_0^o$ | $Vns_0^e$ | ... | $Vns_0^e$ |
| 6 | $Vns_e^e$ | $Vns_e^e$ | $Vns_e^o$ | $Vns_e^o$ | ... | $Vns_e^o$ | $Vns_e^o$ | $Vns_e^o$ | $Vs_e$ | ... | $Vns_e^e$ |
| ... | | | | | | | | | | | |
| ... | | | | | | | | | | | |
| ... | | | | | | | | | | | |
| 511 | $Vns_0^e$ | $Vns_0^e$ | $Vns_0^e$ | $Vns_0^e$ | ... | $V_{s0}$ | $Vns_0^o$ | $Vns_0^o$ | $Vns_0^o$ | ... | $Vns_0^e$ |
| 512 | $Vns_e^e$ | $Vns_e^e$ | $Vns_e^e$ | $Vns_e^e$ | ... | $Vns_e^o$ | $Vns_e^o$ | $Vns_e^o$ | $Vns_e^o$ | ... | $Vs_e$ |

It is apparent from this Table that upon selection of an odd row electrode i with, for example, $V_{s0}$ the subsequent even row electrode (i+1) is driven with a non-selection voltage $Vns_e^o$ likewise as all previous even electrodes, while all odd electrodes with $i<n$ are driven with a non-selection voltage $Vns_0^o$. All row electrodes subsequent to the $(i+1)^{th}$ electrode are driven with voltages $Vns_e^e$ and $Vns_0^o$ which are presented gradually to the successive row electrodes from $t_{256}$ during the presentation of the even field. The different types of non-selection voltages are thus retained until selection for the other field is required. A memory function is required in order to retain this voltage state in a defined manner. It can be realised, for example, by extra flip-flop circuits which are each coupled to a row electrode and flip over upon selection of this row electrode.

Figure 7:
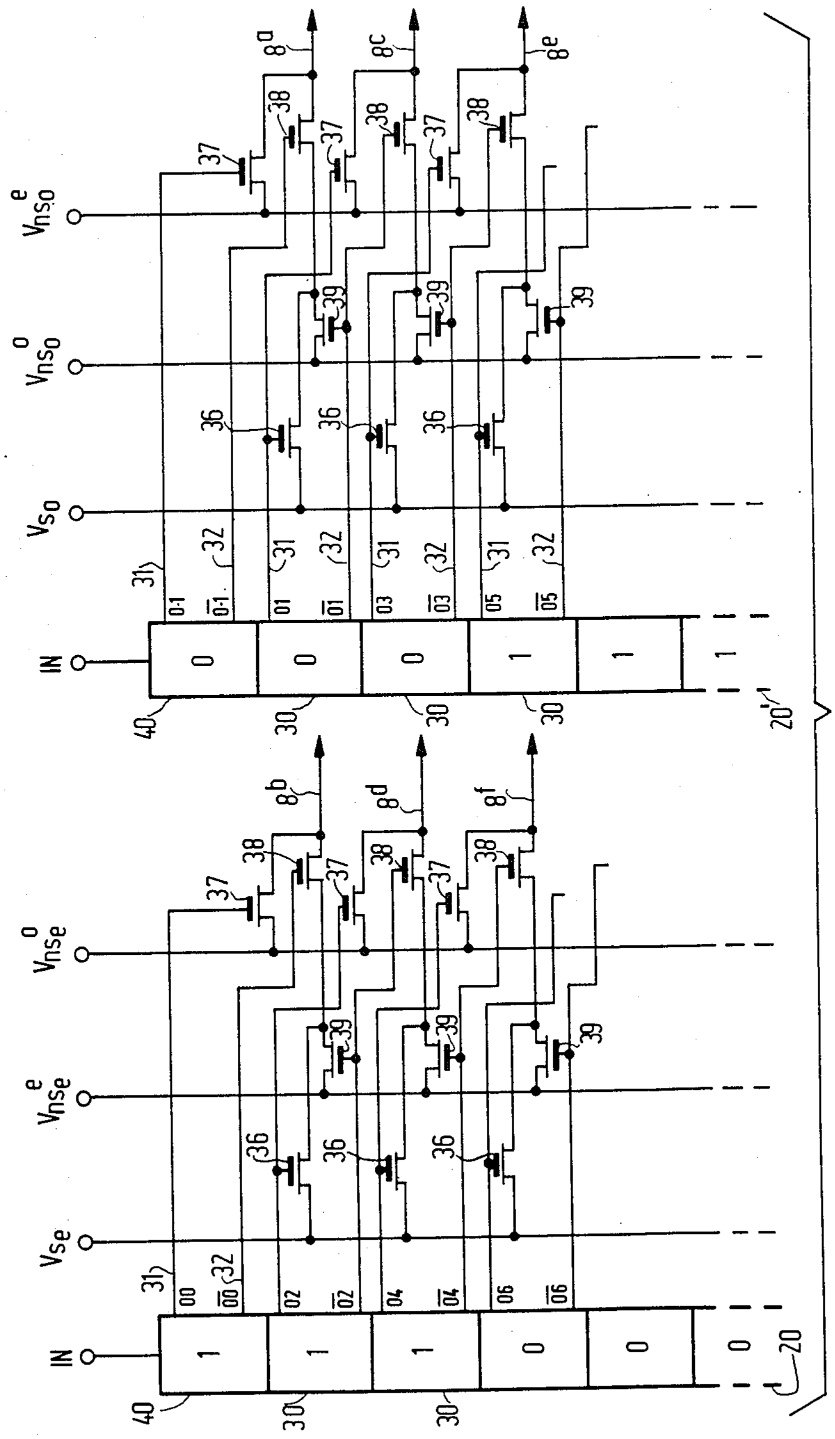

FIG. 7 shows such a circuit which is particularly suitable for integration because the extra memory function is obtained by a shift register. It comprises two shift registers 20, 20' for the even and odd row electrodes, respectively. With respect to the circuit of FIG. 4 these registers have an extra register stage 40. Outputs 31, 32 of the register stages 30, 40 determined whether the switches 37, 38, in this example n-channel MOS transistors again, are connected to a voltage $Vns_0^e$ or whether, dependent on the state of the subsequent register stage 30, a selection is made between a voltage $Vns_0^o$ and a selection voltage $V_{s0}$. Also in this case the circuit may have p-transistors instead of n-transistors, while a combination is alternatively possible in which case driving is possible via one shift register output.

If in this example a register stage is high (1) whereas the previous stages are low (0), a row electrode (in this example $8^e$, i.e. the $5^{th}$ row electrode) is connected via switches 36 and 38 to $V_{s0}$. Since all subsequent stages 30 are also high (1) due to the memory function, the subsequent odd row electrodes ($7^{th}$, $9^{th}$, $11^{th}$, . . . ) are connected to $Vns_o^e$; the row electrodes $8^b$, $8^d$, $8^f$ are connected to $Vns_e^o$ and all other even row electrodes are connected to $Vns_e^e$. This situation is obtained by giving the registers 20 and 20' a substantially complementary content.

For the lines 1, 2 and 3 which have just been written (connected to row electrodes $8^a$, $8^b$ and $8^c$) the maximum cut-off voltage across the diodes is thus considerably reduced because non-selection voltages $Vns_0^o$ and $Vns_e^o$ are presented to the electrodes $8^a$, $8^c$ and $8^b$, $8^d$, respectively. This does not apply to the $6^{th}$ row electrode $8^f$ which is connected to $Vns_e^o$ while electrode $8^g$ is connected to $Vns_0^e$ so that the maximum cut-off voltage may be present across the associated diode, but this lasts only one line period while the associated picture elements are written with new information immediately hereafter so that possible leakage currents hardly have any influence. Upon selection of the subsequent row electrode ($8^g$) in the odd field this cut-off voltage across the diodes between $8^f$ and $8^g$ is removed. The row electrodes $8^g$, $8^i$, $8^k$ are connected to $Vns_0^e$ and the electrodes $8^h$, $8^j$, $8^l$ are connected to $Vns_e^e$ so that the maximum voltage across the diodes is reduced in a similar manner.

The invention is of course not limited to the examples given, but several variations are possible, notably in the realisation of circuits with which a voltage variation as illustrated in FIG. 6 can be obtained.

The invention may also be used in a device driven by the so-called ac-$D^2C$-method as described in "Liquid Crystal Matrix Displays" by B. J. Lechner et al, published in Proc. IEEE, Vol. 59, no. 11, November 1971, pages 1566–1579, particularly page 1574.

Figure 8:
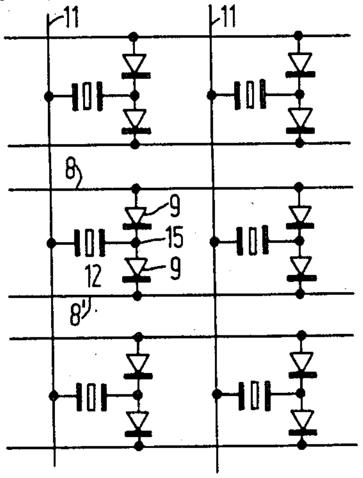
FIG. 7 shows an associated drive circuit and FIG. 8 shows another device according to the invention.

FIG. 8 shows part of such a matrix device in which two row electrodes 8, 8' are available for each selection line and between which electrodes two diodes 9 are present in series while the common point of the diodes is connected to the picture element. For such a matrix similar drive levels can be used as are shown in FIG. 6. Since the lines each time have two separate selection lines, selection of a given row of picture elements does not have any influence on the adjacent rows of picture elements, which leads to a slightly different variation of the voltage levels with respect to time.

The invention may also be used in a device as described in the non-prepublished Netherlands patent application No. 8502662, to which U.S. patent application No. 06/910,103 corresponds, both filed in the name of the Applicant in which at least one first asymmetrical non-linear switching element is incorporated between a first row electrode and a column electrode in series with each picture element and in which at least one extra asymmetrical non-linear switching element of the same polarity is incorporated in series with the first asymmetrical non-linear switching element between the first row electrode and a second row electrode. The first row electrode is then connected via a first number of asymmetrical non-linear switching elements of the same polarity arranged in series with the first asymmetrical non-linear switching element and the second row electrode is connected via a second number of asymmetrical non-linear elements of the same polarity arranged in series with the extra asymmetrical non-linear switching element to a common connection point. The subject matter of U.S. application Ser. No. 910,103 is hereby incorporated by reference.

What is claimed is:

1. A display device comprising: an electro-optical display medium between two supporting plates, a system of picture elements arranged in rows and columns with each picture element comprising two picture electrodes provided on facing surfaces of the supporting plates, a system of n row electrodes and column electrodes for driving the picture elements, the row electrodes being provided on one supporting plate and the column electrodes being provided on the other supporting plate, characterized in that in series with each picture element between a column electrode and two consecutive row electrodes are asymmetrical non-linear switching elements coupled between the picture element and each of the row electrodes, and a drive circuit for driving the row electrodes with selection voltages which, upon selection of the $i^{th}$ row electrode ($0<i\leqq n$) for driving picture elements with information from a first odd or second even field, provides at least the first $(i-1)$ non-selected row electrodes with at least one of a first set of non-selection voltages associated with the relevant field and provides the other non-selected row electrodes with at least one of a second set of non-selection voltages of the other field.

2. A display device as claimed in claim 1, characterized in that two consecutive picture elements in a column are each time connected via asymmetrical non-linear switching elements to a common row electrode, the switching elements, viewed from the common row electrode to the other row electrodes associated with each of the two consecutive picture elements being biassed in the same direction and the $(i+1)^{th}$ row electrode being supplied with a voltage associated with the first set of non-selection voltages.

3. A display device as claimed in claim 1, wherein at least one first asymmetrical non-linear switching element is coupled between a first sub-row electrode and a column electrode in series with each picture element and at least one extra asymmetrical non-linear switching element of the same polarity is coupled between the picture element and a second sub-row electrode in series with the first asymmetrical non-linear switching element between the first sub-row electrode and a second sub-row electrode, characterized in that the first sub-row electrode is connected via a first number of asymmetrical non-linear switching elements of the same polarity connected in series with the first asymmetrical non-linear switching element and the second sub-row electrode is connected via a second number of asymmetrical non-linear switching elements of the same polarity connected in series with the extra asymmetrical non-linear switching element to a row electrode connection.

4. A display device as claimed in claim 1, characterized in that each row electrode can be electrically connected via a first switch to a connection for a selection voltage, or can be electrically connected via a second switch to a point which can be electrically connected via a third or fourth switch to connections for a set of non-selection voltages.

5. A display device as claimed in claim 4, characterized in that the drive circuit has a memory function.

6. A display device as claimed in claim 4, characterized in that the drive circuit has at least one 1:N decoder ($N>n$) or a shift register.

7. A display device as claimed in claim 6, characterized in that the asymmetrical non-linear switching elements are diodes.

8. A display device as claimed in claim 7, characterized in that the electro-optical display medium is a liquid crystal.

9. A display device as claimed in claim 7, characterized in that the electro-optical display medium is an electrophoretic suspension.

10. A display device as claimed in claim 7, characterized in that the electro-optical display medium is an electrochrometic material.

11. A display device as claimed in claim 2 further comprising: a plurality of first, second, third and fourth switches, each row electrode being electrically connectable via a respective first switch of the first plurality of switches to a connection for a selection voltage and being electrically connectable via a respective second switch of the second plurality of switches to a point electrically connectable via a respective third or fourth switch of the third and fourth plurality of switches to connections for a set of non-selection voltages.

12. A display device as claimed in claim 1, characterized in that the drive circuit has a memory function.

13. A display device as claimed in claim 1, characterized in that the drive circuit has at least one 1:N decoder ($N>n$) or a shift register.

14. A display device as claimed in claim 4, characterized in that the asymmetrical non-linear switching elements are diodes.

15. A display device as claimed in claim 1, characterized in that the asymmetrical non-linear switching elements are diodes.

16. A display device as claimed in claim 4, characterized in that the electro-optical display medium is a liquid crystal.

17. A display device as claimed in claim 1, characterized in that the electro-optical display medium is a liquid crystal.

18. A display device as claimed in claim 4, characterized in that the electro-optical display medium is an electrophoretic suspension.

19. A display device as claimed in claim 1, characterized in that the electro-optical display medium is an electrophoretic suspension.

20. A display device as claimed in claim 1, characterized in that the electro-optical display medium is an electrochromatic material.

* * * * *